US010902136B2

(12) United States Patent
Skertic et al.

(10) Patent No.: US 10,902,136 B2
(45) Date of Patent: Jan. 26, 2021

(54) METHOD AND APPARATUS FOR DATA TRANSFER DURING MAINTENANCE ACTIVITY IN A NETWORK

(71) Applicants: Rolls-Royce Corporation, Indianapolis, IN (US); Rolls-Royce North American Technologies Inc., Indianapolis, IN (US)

(72) Inventors: Richard Joseph Skertic, Carmel, IN (US); John Joseph Costello, Indianapolis, IN (US)

(73) Assignees: ROLLS-ROYCE CORPORATION, Indianapolis, IN (US); ROLLS-ROYCE NORTH AMERICAN TECHNOLOGIES INC., Indianapolis, IN (US)

( * ) Notice: Subject to any disclaimer, the term of this patent is extended or adjusted under 35 U.S.C. 154(b) by 238 days.

(21) Appl. No.: 16/191,954

(22) Filed: Nov. 15, 2018

(65) Prior Publication Data
US 2020/0159941 A1 May 21, 2020

(51) Int. Cl.
*G06F 21/00* (2013.01)
*G06F 21/62* (2013.01)
*H04L 29/06* (2006.01)
*H04L 9/32* (2006.01)

(52) U.S. Cl.
CPC ............ *G06F 21/62* (2013.01); *H04L 9/3226* (2013.01); *H04L 63/108* (2013.01)

(58) Field of Classification Search
CPC ...... G06F 21/62; H04L 9/3226; H04L 63/108
See application file for complete search history.

(56) References Cited

U.S. PATENT DOCUMENTS

| 7,302,591 | B2 | 11/2007 | Oliver et al. |
| 7,503,063 | B1 | 3/2009 | Mishra et al. |
| 8,458,409 | B2 | 6/2013 | Asai et al. |
| 9,043,610 | B2 | 5/2015 | Wang et al. |
| 9,239,578 | B2 * | 1/2016 | Ziarno .................... F02C 9/00 |
| 9,659,179 | B1 | 5/2017 | Fredinburg et al. |
| 2009/0260055 | A1 | 10/2009 | Parmar |

OTHER PUBLICATIONS

GE Aviation and AT&T Enable Aircraft Health Monitoring, Jun. 2017, 5pgs. http://about.att.com/story/ge_aviation_and_att_enable_aircraft_health_monitoring.html.

* cited by examiner

*Primary Examiner* — Jeffrey C Pwu
*Assistant Examiner* — Thong P Truong
(74) *Attorney, Agent, or Firm* — Brinks Gilson & Lione

(57) ABSTRACT

Control systems and methods to secure maintenance access to aircraft control system. The aircraft control system includes a control node operably coupled to an engine health monitoring node that includes a maintenance port. The aircraft control system also includes an enclosure preventing physical access to the maintenance port. The enclosure includes a key lock that, when activated, allows for physical access to the maintenance port. The engine health monitoring node can determine whether to allow a maintenance port data transfer access request to transfer data across the maintenance port based on the validity of received credentials, such as a password. The engine health monitoring node can also determine whether to allow or disallow encrypted or unencrypted data transfers based on whether a keep alive message is periodically received. The engine health monitoring node can also store data related to the maintenance port data transfer access request to memory.

20 Claims, 6 Drawing Sheets

US 10,902,136 B2

METHOD AND APPARATUS FOR DATA TRANSFER DURING MAINTENANCE ACTIVITY IN A NETWORK

BACKGROUND

Aircrafts, such as commercial and military aircraft, include aerospace control systems that control and monitor aircraft engines. The aerospace control systems may control and/or monitor aerospace control system components such as, for example, aircraft engine pressure sensors, temperature sensors, solenoids, and actuators. The aerospace control systems may also control and/or manage other aircraft engine parts and/or functionality. For example, aerospace control systems may assist in ensuring optimum aircraft engine efficiencies during flight are achieved by receiving various flight condition information and controlling various aircraft engine operations, such as fuel flow, valve positions, and others. Aerospace control systems may include a full authority digital engine controller (FADEC) that includes an electronic engine controller (EEC) or engine control unit (ECU). The FADEC may further include a central processing unit (CPU), memory, and a data bus to communicate with other aircraft engine components, such as aircraft engine sensors and actuators.

The aerospace control system may include an engine health monitor (EHM), which may be known as an engine monitoring unit (EMU), that monitors and records data related to operation of the aircraft engine, such as a flight log. The EHM/EMU may include maintenance ports that allow for the download of recorded data. These ports may include connector interfaces for various connector types such as Ethernet ports or controller area network (CAN) ports. Typically, a maintenance technician accesses the maintenance port to the EHM/EMU and downloads the data to a separate maintenance computer for post-processing and data analysis. The maintenance ports may also allow for the upload of software, such as software updates to an operating system or application of a FADEC or EHM/EMU, from the maintenance computer to the EHM/EMU. As such, there are opportunities to address.

These aerospace architectures, however, have vulnerabilities during maintenance in a cyber-hostile environment. For example, threats from a cyber-attack can come from software loaded onto the FADEC via a maintenance port to the EHM/ECU. For example, an unauthorized technician or hacker may connect to the maintenance port of an EHM/ECU while the aircraft is on the ground and upload malicious software to the FADEC. In addition, these aerospace architectures are vulnerable to the un-authorized downloading of recorded flight data, such as flight logs. For example, an unauthorized technician or hacker may download flight log data and sell the information without permission. As such, there are opportunities to address these and other vulnerabilities with aerospace control systems.

SUMMARY

In some embodiments, a method for accessing an aircraft control system comprises receiving, by a key lock that secures a maintenance port of an engine health monitoring node, a key input. The method may include providing physical access to the maintenance port of the engine health monitoring node in response to receiving the key input. The method may also include receiving, via the maintenance port of the engine health monitoring node, data identifying a maintenance port data transfer access request comprising a password. The method may further include determining whether the received password matches a predetermined password to allow data transfer access through the maintenance port of the engine health monitoring node. The method may also include, in response to determining that the received password matches the predetermined password, allowing an encrypted data transfer through the maintenance port of the engine health monitoring node, and determining whether data identifying a keep alive message is received periodically within a maximum amount of time.

The method may further include, in response to determining that the data identifying the keep alive message is received periodically within the maximum amount of time, allowing a non-encrypted data transfer through the maintenance port of the engine health monitoring node, and in response to determining that the data identifying the keep alive message is not received periodically within the maximum amount of time, disallowing the non-encrypted data transfer through the maintenance port of the engine health monitoring node. The method may also include storing, to a maintenance data log stored in a memory device, data identifying the maintenance port data transfer access request.

In some embodiments, an aircraft control system is provided. The aircraft control system comprises a control node comprising a first processor, and an engine health monitoring node operatively coupled to the control node and comprising a second processor and a maintenance port. The aircraft control system may also comprise an enclosure preventing physical access to the maintenance port, where the enclosure comprises a key lock that, in response to receiving a key input, allows for physical access to the maintenance port of the engine health monitoring node.

The engine health monitoring node may be configured to receive, via the maintenance port of the engine health monitoring node, data identifying a maintenance port data transfer access request comprising a password. The engine health monitoring node may also be configured to determine whether the received password matches a predetermined password to allow data transfer access through the maintenance port of the engine health monitoring node. The engine health monitoring node may also be configured to, in response to determining that the received password matches the predetermined password, allow an encrypted data transfer through the maintenance port of the engine health monitoring node, and determine whether data identifying a keep alive message is received periodically within a maximum amount of time.

The engine health monitoring node may be configured to, in response to determining that the data identifying the keep alive message is received periodically within the maximum amount of time, allow a non-encrypted data transfer through the maintenance port of the engine health monitoring node. The engine health monitoring node may also be configured to, in response to determining that the data identifying the keep alive message is not received periodically within the maximum amount of time, disallow the non-encrypted data transfer through the maintenance port of the engine health monitoring node. The engine health monitoring node may also be configured to store, to a maintenance data log stored in a memory device, data identifying the maintenance port data transfer access request.

In some embodiments a non-transitory, computer-readable storage medium includes executable instructions that, when executed by one or more processors, cause the one or more processors to perform operations including receiving a key input signal indicating that a key lock that secures a maintenance port of an engine health monitoring node has received a key input. The operations may also include providing a key unlock signal to the key lock in response to receiving the key input to allow physical access to the maintenance port of the engine health monitoring node. The operations may further include receiving, via the maintenance port of the engine health monitoring node, data identifying a maintenance port data transfer access request comprising a password, and determining whether the received password matches a predetermined password to allow data transfer access through the maintenance port of the engine health monitoring node.

The operations may also include, in response to determining that the received password matches the predetermined password, allowing an encrypted data transfer through the maintenance port of the engine health monitoring node, and determining whether data identifying a keep alive message is received periodically within a maximum amount of time. The operations may further include, in response to determining that the data identifying the keep alive message is received periodically within the maximum amount of time, allowing a non-encrypted data transfer through the maintenance port of the engine health monitoring node.

The operations may include, in response to determining that the data identifying the keep alive message is not received periodically within the maximum amount of time, disallowing the non-encrypted data transfer through the maintenance port of the engine health monitoring node. The operations may also include storing, to a maintenance data log stored in a memory device, data identifying the maintenance port data transfer access request.

BRIEF DESCRIPTION OF THE DRAWINGS

The following will be apparent from elements of the figures, which are provided for illustrative purposes.

Figure 1:
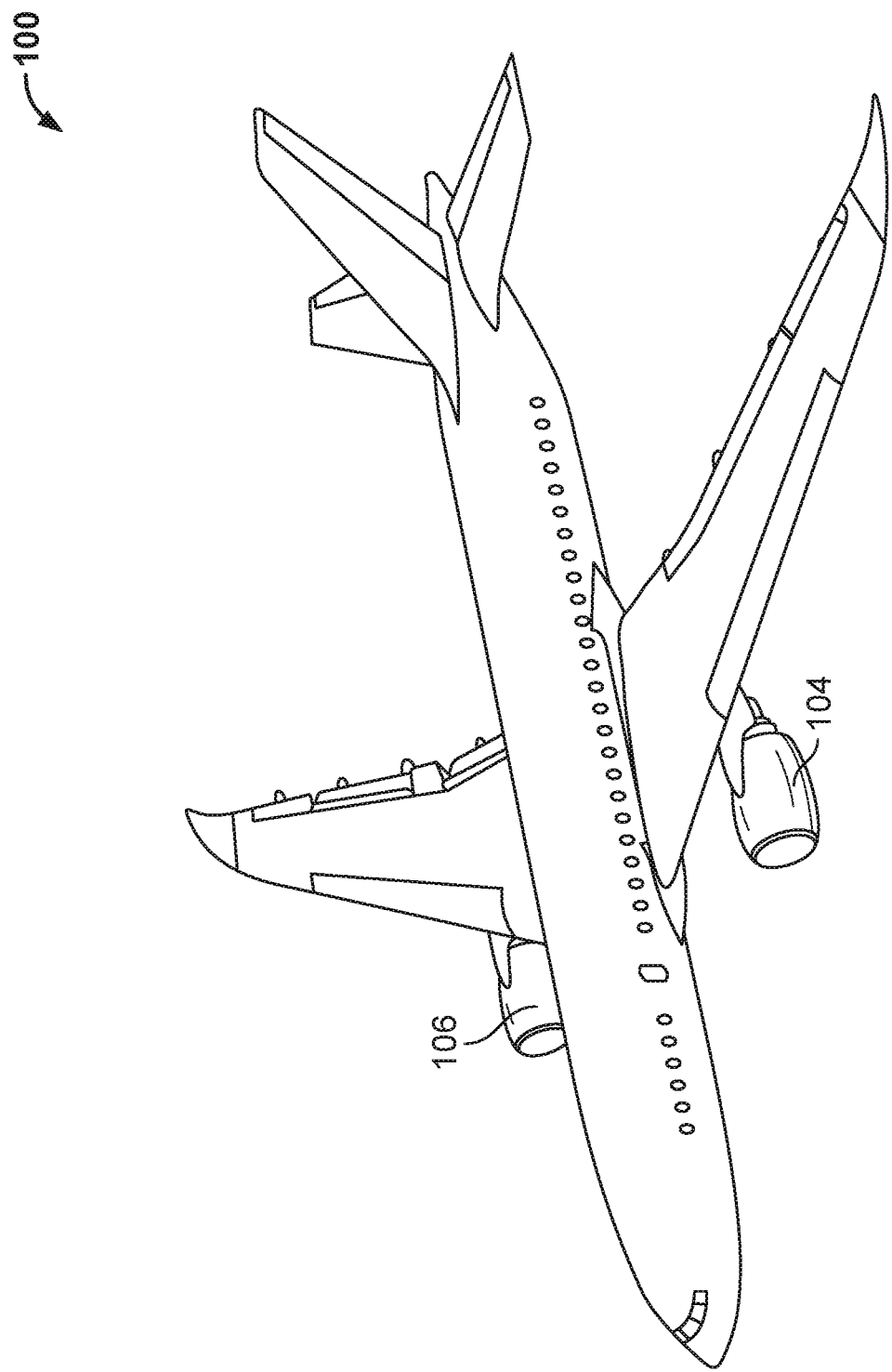
FIG. 1 is an illustration of an aircraft with engines employing an engine control system in accordance with some embodiments.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments in the drawings and specific language will be used to describe the same.

FIG. 1 illustrates an example aircraft 100 with turbine engines 104, 106. Each turbine engine may be controlled by an engine control system, which is discussed in more detail with respect to FIGS. 2, 3, and 4.

Figure 2:
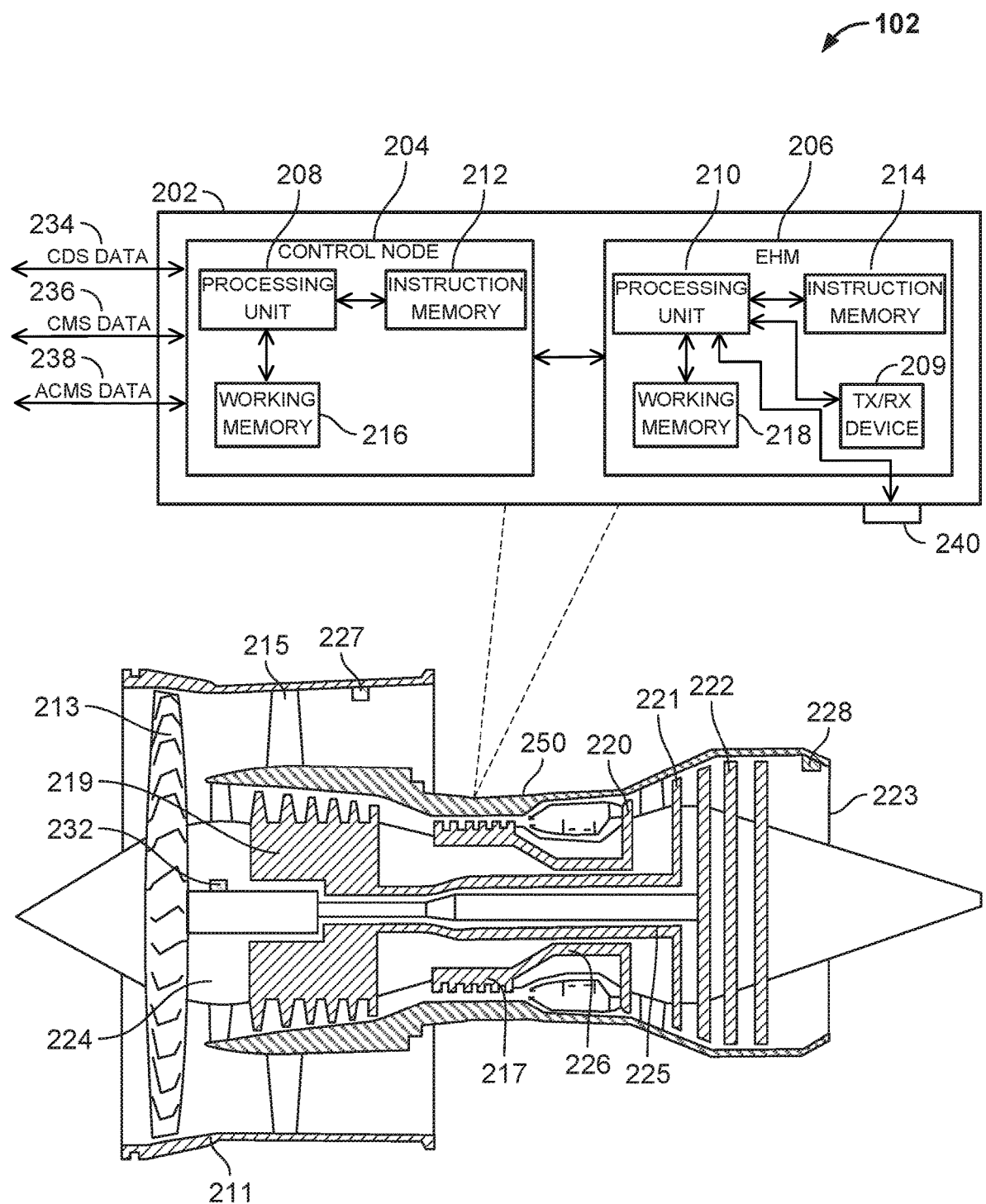
FIG. 2 is an illustration of an aircraft engine of FIG. 1 employing an engine control system in accordance with some embodiments.

FIG. 2 illustrates the aircraft engine 102 of the example aircraft 100 of FIG. 1 in more detail. The aircraft engine 102 includes an engine control system 202 that includes a control node 204 and engine health monitoring node 206. The control node 204 may be, for example, a FADEC, while the engine health monitoring node 206 may be, for example, an EHM or EMU. Each of the control node 204 and engine health monitoring node 206 includes electronic circuitry. The electronic circuitry may include one or more processing units 208, 210. A processing unit can be, for example, a microprocessor, an execution unit or "core" on a microprocessor chip, a digital signal processor (DSP), a soft or hard core within a field-programmable gate arrays (FPGA), a processor within an application-specific integrated circuit (ASIC), a central processing unit (CPU), a general processing unit (GPU), a commercial off the shelf (COTS) processor, or any other suitable processor.

Each of the control node 204 and engine health monitoring node 206 may include instruction memory 212, 214, respectively. Instruction memory 212, 214 can store instructions that can be accessed (e.g., read) and executed by processing units 208, 210, respectively. For example, each of instruction memory 212, 214 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Each of the control node 204 and engine health monitoring node 206 may also include working memory 216, 218, respectively. Processing units 208, 210 can store data to, and read data from, working memory 216, 218, respectively. For example, processing units 208, 210 can store a working set of instructions to working memory 216, 218, such as instructions loaded from instruction memory 212, 214, respectively. Processing units 208, 210 can also use working memory 208, 210, respectively, to store dynamic data.

Control node 204 is operable to receive data from, and transmit data to, a cockpit display system (CDS). For example, as indicated in FIG. 2, control node 204 may receive or transmit CDS data 234 over a network, such as an avionics data network, from or to a CDS, respectively. The CDS may be located in a cabin area of an aircraft, for example. Control node 204 may also receive data from, or transmit data to, a central maintenance system (CMS). The data may be received or transmitted over a network, such as an avionics data network, as indicated by CMS data 236. Similarly, control node 204 may also receive data from, or transmit data to, an aircraft condition monitoring system (ACMS). The data may be received or transmitted over a network, such as an avionics data network, as indicated by ACMS data 238.

Engine health monitoring node 206 may also include a transceiver device 209 coupled to processing unit 210. Transceiver device 209 allows for communication with one or more networks, such as a wireless network. Engine health monitoring node 206 may also include a maintenance port 240 operably coupled to processing unit 210. Maintenance port 240 may be an Ethernet port, a controller area network (CAN) port, or any other suitable port. Maintenance port 240 may allow for the download, or the upload, of data to engine control system 202.

For example, a maintenance technician servicing engine control system 202 may interface a maintenance computer (shown in FIG. 4) to the engine control system 202 via maintenance port 240 using a corresponding cable (e.g., Ethernet cable, CAN cable, etc.). The maintenance port 240 may allow the maintenance computer to download logged data for post-processing and data analysis of one or more previous flights. Maintenance port 240 may also allow the maintenance computer to upload software (e.g., code) updates to control node 204 or engine health monitoring node 206. In some examples, the maintenance computer may communicatively couple to the engine control system 202 via a wireless connection, such as via transceiver device 209.

FIG. 2 further illustrates, as part of aircraft engine 102, a fan 213, a first compressor 219, a second compressor 217, turbines 220, 221, 222, propulsion nozzle 223, and fan duct 211. The fan duct 211 is supported by guide vanes 215 extending from engine platform 250. The fan 213 is driven by a first shaft 224 connected to fan 213. First compressor 219 is driven by turbine 221 via a second shaft 225, and second compressor 217 is driven by turbine 220 via a third shaft 226.

Engine control system 202 may also be communicatively coupled to one or more engine control devices 227, 228, 232, such as sensors (e.g., pressure, temperature, speed, vibration, electromagnetic transducers) or actuators. One or more of control node 204 and engine health monitoring node 206 may be operable to receive data from, or transmit data to, one or more of engine control devices 227, 228, 232. For example, control node 204 may receive speed and temperature data from a speed sensor and temperature sensor, respectively, and provide control signals to one or more actuators. Engine health monitoring node 206 may receive pressure, electromagnetic, and vibration data from a pressure sensor, electromagnetic sensor, and vibration sensor, respectively. In some examples, control node 204 and engine health monitoring node 206 may communicate measured sensor data with one another.

Figure 3:
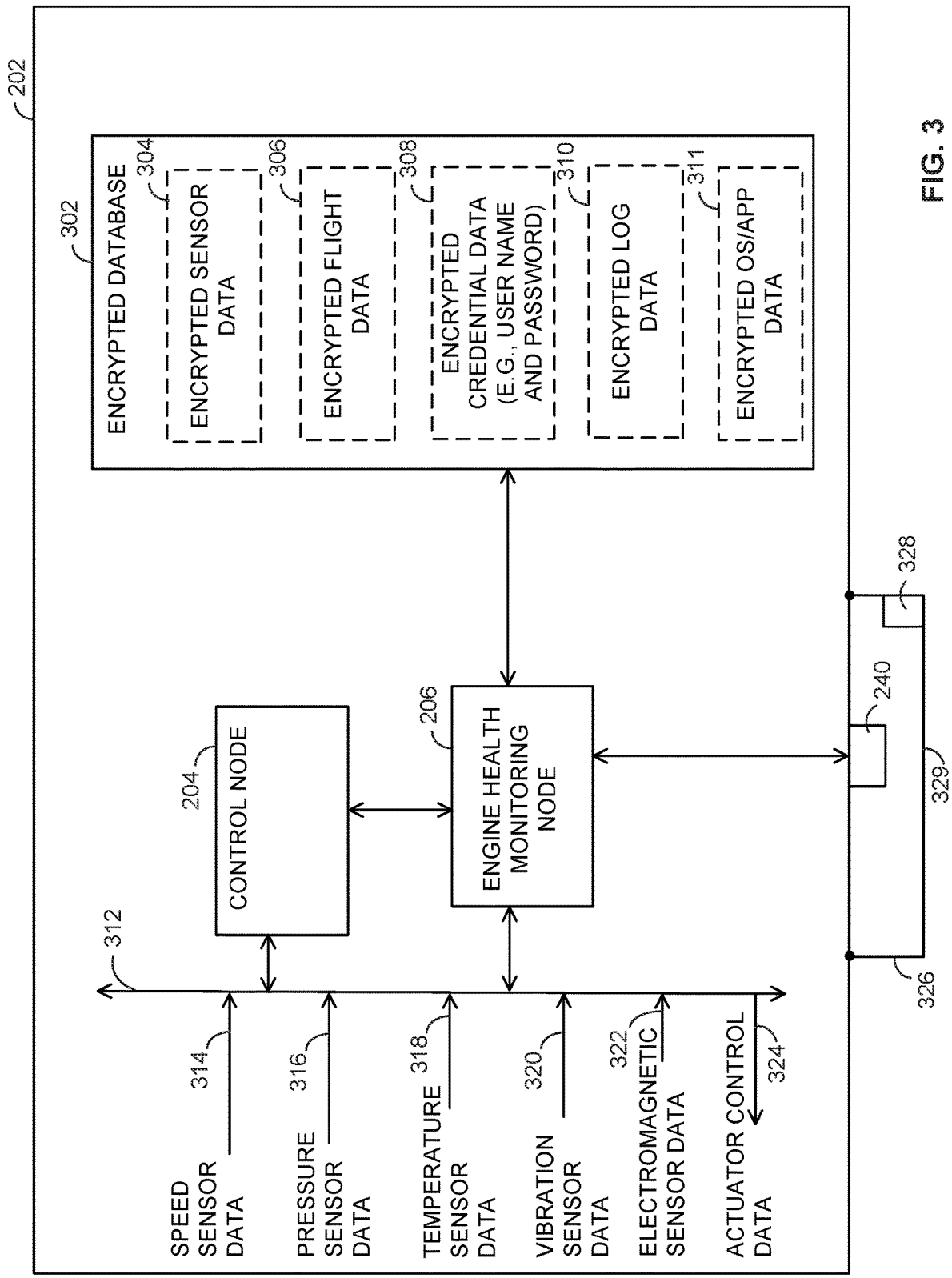
FIG. 3 is another block diagram of the engine control system of FIG. 2 in accordance with some embodiments.

FIG. 3 illustrates a block diagram of the engine control system 202 of FIG. 2. As indicated in the figure, control node 204 and engine health monitoring node 206 may be operably connected to bus 312. Bus 312 may be, for example, an avionics data network, or any other suitable network. One or more speed sensors, such as one located on or within the aircraft engine 102 of FIG. 2, may provide speed sensor data 314 on bus 312. Similarly, one or more pressure sensors may provide pressure sensor data 316 to bus 312. One or more temperature sensors may provide temperature sensor data 318 to bus 312. In addition, one or more vibration sensors may provide vibration sensor data 320 to bus 312, and one or more electromagnetic sensors may provide electromagnetic sensor data 322 to bus 312. One or more of control node 204 and engine health monitoring node 206 may obtain one or more of speed sensor data 314, pressure sensor data 316, temperature sensor data 318, vibration sensor data 320, and electromagnetic sensor data 322 from bus 312. In some examples, one or more actuators, such as one located on or within the aircraft engine 102 of FIG. 2, may be operably connected to bus 312. Control node 204 may control one or more of the actuators by providing actuator control data 324 to bus 312.

As further illustrated in FIG. 3, engine health monitoring node 206 is operably connected to maintenance port 240. Access to maintenance port 240 is secured by security cover 326, which may include security door 329. Key lock 328, when engaged (e.g., locked), locks security door 329 to security cover 326, thereby securing access to maintenance port 240. Security door 329 may be, for example, a security door that is removed, or may swing out, to allow access to maintenance port 240 when key lock 328 is disengaged (e.g., unlocked). Key lock 328 may be engaged or disengaged with a corresponding key or tool (e.g., one that allows the opening of key lock 328). As such, security cover 326 provides a physical barrier to accessing maintenance port 240.

In some examples, key lock 328 may be engaged (e.g., opened or closed) electronically. For example, key lock 328 may provide a key input signal, such as a digital key input signal, to engine health monitoring node 206 indicating that key lock 328 has received a key input, such as a key or tool. In response, engine health monitoring node 206 may provide a key unlock signal to key lock 328 to allow physical access to maintenance port 240 of the engine health monitoring node 206.

In some examples, key lock 328 includes a radio-frequency identification (RFID) reader. In these examples, to unlock key lock 328, an RFID signal is received from an RFID tag (e.g., RFID card) that corresponds (e.g., links) to the RFID reader. For example, a maintenance technician may be in possession of an RFID tag that can couple to the RFID reader of key lock 328. Moving the RFID tag into the operation area of the RFID reader may cause key lock 328 to open. The key lock 328 may lock again after a minimum amount of time, or after moving the RFID tag into the operation area of the RFID reader a second time, for example.

In some examples, when security door 329 is closed, wireless access to engine health monitoring node 206 is prevented. For example, transceiver device 209 may be held in a disabled state while security door 329 is closed. Upon opening security door 329, transceiver device 209 is enabled, allowing engine health monitoring node 206 to establish a wireless communication with, for example, a maintenance computer. In other examples, security cover 326 acts as a physical barrier to block frequency ranges of radio waves such that a wireless session cannot be established with transceiver 209. Once security door 329 is opened, the radio waves may freely pass from and to maintenance port 240, thereby allowing a wireless communication session to be established with engine health monitoring node 206.

Engine control system 202 may also maintain, within one or more tangible, non-transitory memories (e.g., memory device), one or more structured or unstructured data repositories or databases. In this example, engine control system 202 maintains encrypted database 302. Encrypted database 302 is operably connected to engine health monitoring node 206. Encrypted database 302 may include, for example, encrypted sensor data 304, encrypted flight data 306, encrypted credential data 308, encrypted data logger data 310, and encrypted operating system (OS)/application data 311.

In some examples, engine health monitoring node 206, during flight operation, for example, obtains and encrypts one or more of speed sensor data 314, pressure sensor data 316, temperature sensor data 318, vibration sensor data 320, and electromagnetic sensor data 322. Engine health monitoring node 206 may then store the encrypted sensor data 304 in encrypted database 302. Similarly, engine health monitoring node 206 may obtain flight data, such as CDS data 234, CMS data 236, or ACMS data 238 described above with respect to FIG. 2, and encrypt the data to generate encrypted flight data 306. Encrypted flight data 306 may be stored in encrypted database 302.

In some examples, engine health monitoring node 206 may obtain credential data, such as a user name or password, encrypt the credential data and store the encrypted credential data 308 in encrypted database 302. As described below with respect to FIG. 4, engine health monitoring node 206 may require the credential data (e.g., password) to be received via maintenance port 240 prior to allowing any upload or download of data to or from engine control system 202.

In some examples, engine health monitoring node 206 may store data related to a maintenance port 240 access to a data log located in a local repository or database. For example, engine health monitoring node 206 may determine when a cable is inserted into maintenance port 240, such as by processing unit 210 receiving a signal when the cable is inserted. Engine health monitoring node 206 may record data related to the date (e.g., day, month, time) of when the cable was inserted, and store the data to a data log in a memory device. In some examples, data related to any upload or download of data may also be recorded. For example, data identifying an upload of software, or download of data, such as sensor data or flight data, may be recorded and stored to a data log in a memory device. In some examples, engine health monitoring node 206 may encrypt the data and store encrypted log data 310 in encrypted database 302.

In some examples, engine health monitoring node 206 may store executable code, such as code executable by processing units 208, 201 of engine control node 204 and engine health monitoring node 206, respectively, in encrypted database 302. For example, engine health monitoring node 206 may receive an operating system (OS) or application software update via maintenance port 240. Engine health monitoring node 206 may encrypt the software update with an encryption key, and store the encrypted OS/application data 311 in encrypted database 302. In some examples, the software update may be received in an encrypted state. When ready to execute the software update, engine control node 204 or engine health monitoring node 206 may obtain encrypted OS/application data 311 from encrypted database 302. Engine control node 204 or engine health monitoring node 206 may then unencrypt and execute the software update.

Figure 4:
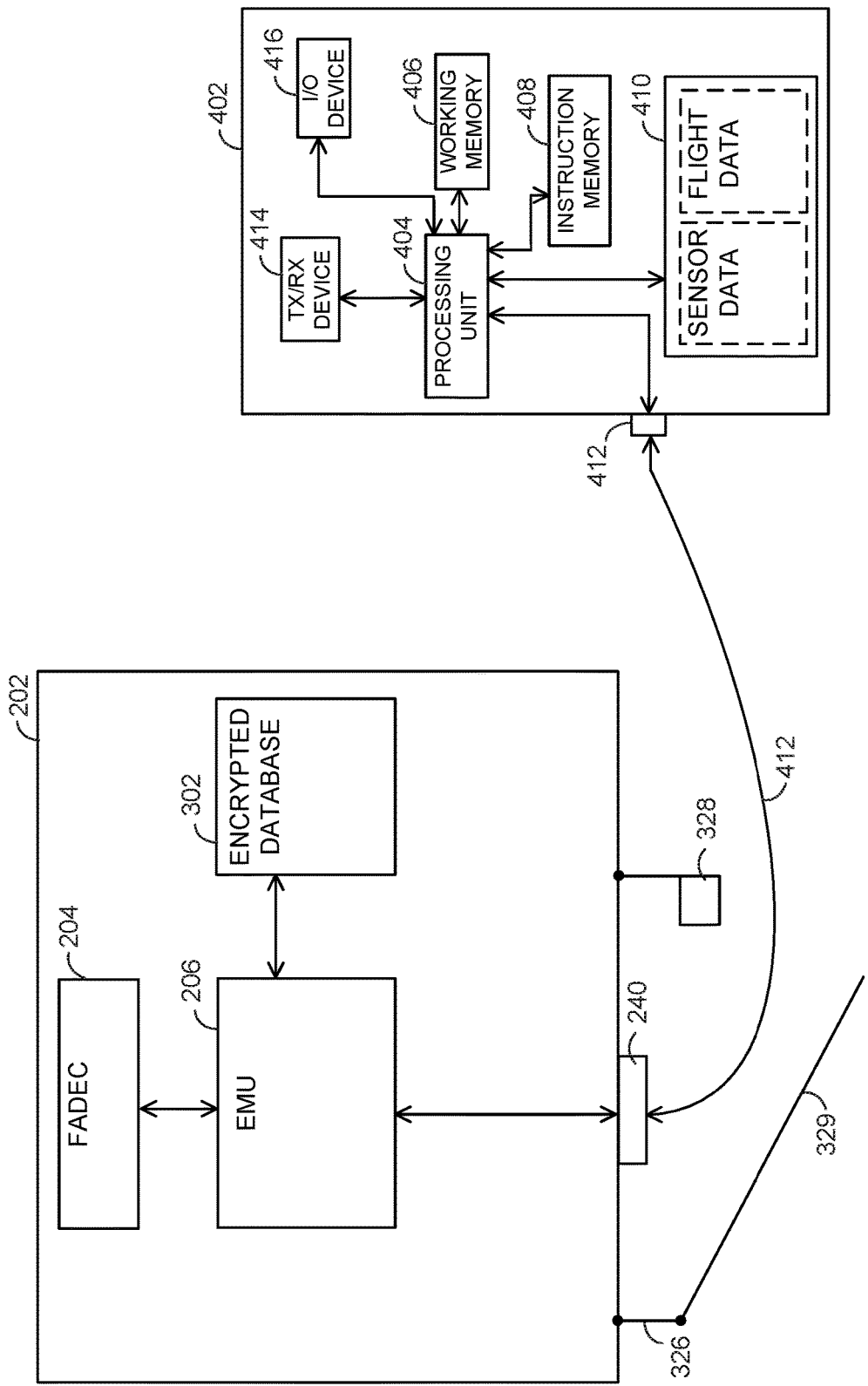
FIG. 4 is yet another block diagram of the engine control system of FIG. 2 connected to a maintenance device in accordance with some embodiments.

FIG. 4 is block diagram of the engine control system 202 of FIG. 2 in communication with a maintenance device 402. Maintenance device 402 includes processing unit 404 operably coupled to working memory 406, instruction memory 408, transceiver device 414, communication port 412, input/output device 416, and display 410. Maintenance device 402 may be, for example, a computer, a laptop, a cellular device, a server such as a cloud-based server, or any other suitable device.

Processing unit 404 can include one or more distinct processors, each having one or more cores. Each of the distinct processors can have the same or different architecture. Processing unit 404 can include one or more CPUs, one or more GPUs, one or more COTS, ASICs, DSPs, and the like.

Processing unit 404 can be configured to perform a certain function or operation by executing code, such as code stored in instruction memory 408, embodying the function or operation. Instruction memory 408 can be a non-transitory, computer-readable storage medium such as a ROM, an EEPROM, flash memory, a removable disk, CD-ROM, any non-volatile memory, or any other suitable memory.

Processing unit 404 can store data to, and read data from, working memory 406. For example, processing unit 404 can store a working set of instructions to working memory 406, such as instructions loaded from instruction memory 408. Processing unit 404 can also use working memory 406 to store dynamic data created during operation of maintenance device 402. Working memory 406 can be a RAM such as a SRAM, DRAM, or any other suitable memory.

Input-output device 416 can include any suitable device that allows for data input or output. For example, input-output device 416 can include one or more of a keyboard, a touchpad, a mouse, a stylus, a touchscreen, a physical button, a speaker, a microphone, or any other suitable input or output device.

Transceiver device 414 allows for communication with a network, such as a wireless communication network. For example, the network may be a cellular network, a Wi-Fi network, or any other suitable network. Processing unit 404 is operable to receive data from, or send data to, the network via transceiver device 414. In some examples, maintenance device 402 can wirelessly communicate with engine control system 202 via transceiver device 414.

Display 410 can display a user interface. The displayed user interface can enable user interaction with maintenance device 402. In some examples, a user can interact with the user interface by engaging input-output device 416. In some examples, display 410 can be a touchscreen, where the user interface is displayed on the touchscreen. The user interface may also display data, such as sensor data and flight data, that is downloaded from engine control system 202. The user interface may also facilitate the upload of data to engine control system 202, such as by allowing for a selection of software (e.g., an engine control system 202 OS or application update) to be uploaded.

In this example, engine control system 202 is operably coupled to maintenance device 402 via a cable 412. Cable 412 connects maintenance port 240 of engine control system 202 to communication port 412 of maintenance device 402. Communication port 412 can include, for example, a serial port such as a universal asynchronous receiver/transmitter (UART) connection, a Universal Serial Bus (USB) connection, or any other suitable communication port or connection. As illustrated in the figure, security door 329 is open, as key lock 328 has been disengaged. By opening security door 329, physical access to maintenance port 240 is made available.

In some examples, after gaining physical access to maintenance port 240, the engine health monitoring node 206 may receive data identifying a maintenance port data transfer access request. In some examples, the data is received via a wired connection to the communication port 412 of maintenance device 402. In other examples, the data is received via a wireless connection to maintenance device 402. The maintenance port data transfer access request may include, for example, a password. Engine health monitoring node 206 may determine whether the received password matches a predetermined password to allow a data transfer through the maintenance port 240. For example, engine health monitoring node 206 may compare the received password with a password encrypted in encrypted credential data 308 stored in encrypted database 302 of FIG. 3. Engine health monitoring node 206 may unencrypt encrypted credential data 308 to identify a stored password, and compare it to the received password to determine a password match.

If engine health monitoring node 206 determines the passwords do not match, engine health monitoring node 206 may reject (e.g., disallow) all data transfers through maintenance port 240. For example, engine health monitoring node 206 may ignore (e.g., not act upon) any data received unless the data identifies another maintenance port data transfer access request (e.g., identifying the password). In some examples, engine health monitoring node 206 rejects all data, including subsequent maintenance port data transfer access requests, until a minimum amount of time has passed since determining that the received password did not match the predetermined password.

If engine health monitoring node 206 determines the passwords match, engine health monitoring node 206 may then allow an encrypted data transfer through maintenance port 204. For example, engine health monitoring node 206 may first attempt to decrypt any data received from maintenance device 402 with a decryption key (e.g., a predefined decryption key). In some examples, the decryption key is received (e.g., unencrypted) from engine health monitoring node 206. If the data decrypts successfully, engine health monitoring node 206 may act upon the data. For example, the data may identify a data download request, or a software update request. Engine health monitoring node 206 may receive the software update, unencrypt it with the decryption key, and store it to a local repository or database. In some examples, as discussed above with respect to FIG. 3, the software update may be stored encrypted.

As another example, if the data identifies a data download request, such as a request for sensor, flight, or data log data, engine health monitoring node 206 may encrypt the requested data with an encryption key. In some examples, as discussed above with respect to FIG. 3, the data may already be encrypted, as stored in encryption database 302. Engine health monitoring node 206 may then transmit the encrypted data to maintenance device 402. Maintenance device 402 may unencrypt the data with a corresponding decryption key.

If the data does not unencrypt successfully, engine health monitoring node 206 may not act upon the data. For example, engine health monitoring node 206 may delete the data. In some examples, engine health monitoring node 206 may transmit an error message to maintenance device 402 indicating that the decryption was unsuccessful.

In some examples, engine health monitoring node 206 determines whether data identifying a keep alive message is received from maintenance device 402 periodically within a maximum amount of time (e.g., within 5 seconds). If engine health monitoring node 206 determines that data identifying a keep alive message is received periodically within the maximum amount of time, engine health monitoring node 206 may allow a non-encrypted data transfer through maintenance port 240. For example, engine health monitoring node 206 would no longer require an encrypted data transfer from maintenance device 402. In some examples, engine health monitoring node 206 provides a signal (e.g., message) to maintenance device 402 identifying whether encrypted data transfers are required.

In some examples, if engine health monitoring node 206 determines that data identifying the keep alive message is not received periodically within the maximum amount of time, engine health monitoring node 206 may disallow non-encrypted data transfers through maintenance port 240. Engine health monitoring node 206 may allow, however, encrypted data transfers. For example, engine health monitoring node 206 may decrypt received data with a decryption key previously received from maintenance device 402.

For example, engine health monitoring node 206 may have begun receiving data identifying the keep alive message periodically with the maximum amount of time, and thus allowed unencrypted data transfers. If, however, engine health monitoring node 206 determines that data identifying the keep alive message has stopped, or has not been received with the last maximum amount of time, engine health monitoring node 206 may provide an error message to maintenance device 402 and reject (e.g., delete) any subsequent non-encrypted data transfers.

In some examples, if engine health monitoring node 206 determines that data identifying the keep alive message has not been received periodically within the maximum amount of time, engine health monitoring node 206 may require successfully receiving a password a second time to allow continued data transfer access through the maintenance port 240. For example, engine health monitoring node 206 may reject all subsequent data transfers until a password matching a stored password is received as described above.

Figure 5:
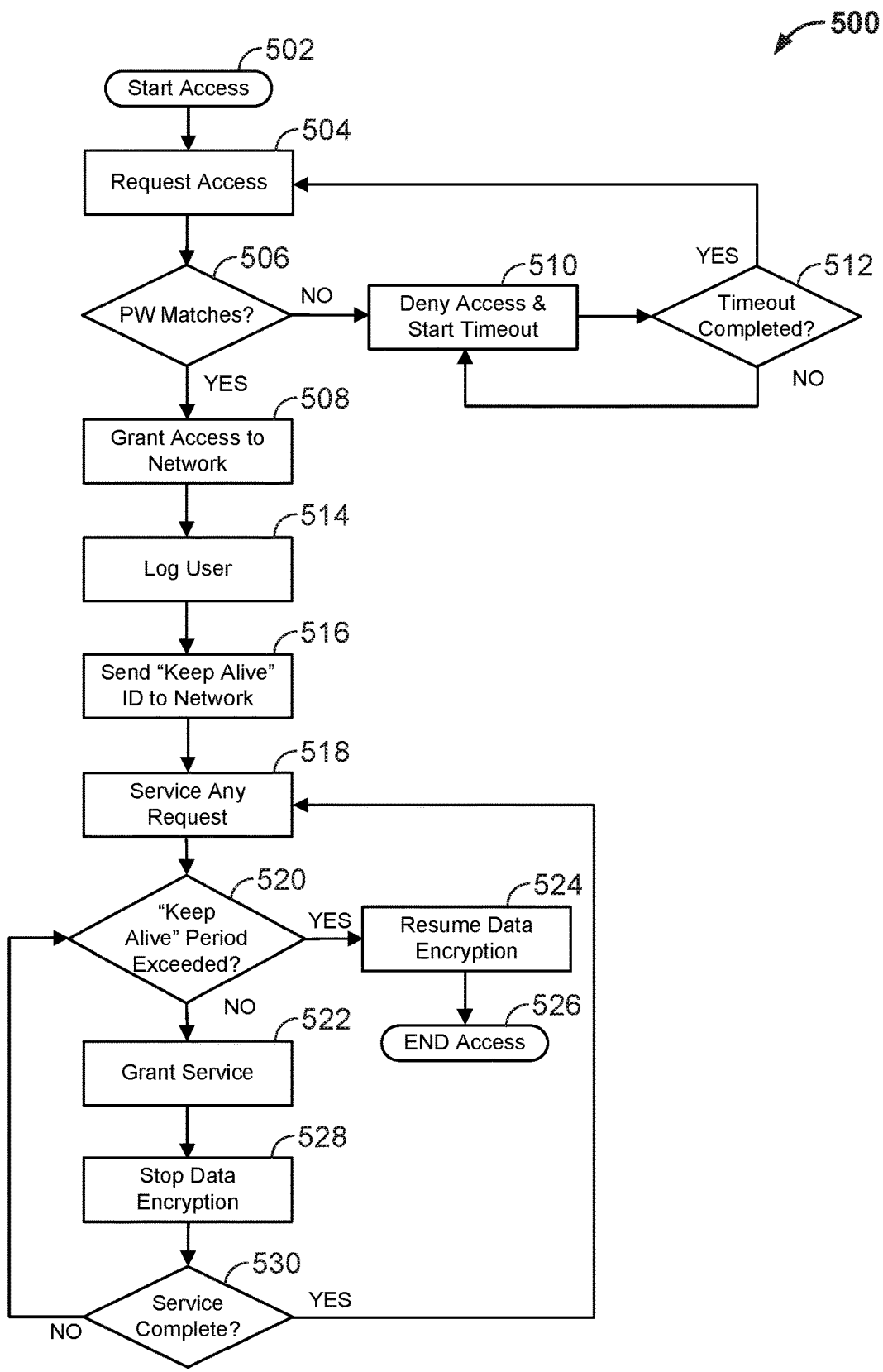
FIG. 5 is a flowchart of an example method that can be carried out by the engine control system of FIG. 3 in accordance with some embodiments.

FIG. 5 is a flowchart of an example method 500 that can be carried out by, for example, the engine control system of FIG. 3. At step 502, an access to a maintenance port, such as maintenance port 240, begins. For example, a user of a maintenance computer, such as maintenance computer 402, may physically install (e.g., insert) a communication cable into the maintenance port 240 of engine health monitoring node 206. The cable may also be connected to a communications port of the maintenance computer. In some examples, rather than a physical cable, a wireless communication between the maintenance computer and the engine control system is established. At step 504, the maintenance computer requests access of the maintenance port. For example, the maintenance computer may transmit a maintenance port data transfer request that includes a password to the engine health monitoring node 206 via the communication cable.

Proceeding to step 506, a determination is made as to whether the password matches a predefine password. For example, the engine health monitoring node may compare a predefined password stored in a local repository to the received password. If the received password matches the predetermined password, the method proceeds to step 508. Otherwise, the method proceeds to step 510.

At step 510, access to the maintenance port is denied, and a timeout is started. For example, upon determining that the passwords do no match, engine health monitoring node 206 may reject any data received via maintenance port 240 and start a timer, such as a hardware or software timer. Proceeding to step 512, a determination is made as to whether the timeout has completed. Once the timeout completes, the method proceeds back to step 504, where requests for access of the maintenance port may again be received. For example, until the timeout expires, engine health monitoring node 206 rejects all data that is received via the maintenance port 240. Once the timeout expires, engine health monitoring node 206 may accept and act upon a maintenance port data transfer request.

Back at step 508, if the passwords match access is then granted to the network. For example, engine health monitoring node 206 may allow the upload and download of data through maintenance port 240 of engine health monitoring node 206. Proceeding to step 514, the data related to the user is logged. For example, engine health monitoring node 206 may store in a local repository data related to one or more of a user name, password, time, date, and data request associated with the maintenance port data transfer request.

At step 516, a keep alive identification (ID) is transmitted to the maintenance port. For example, maintenance computer 402 may transmit a keep alive ID to engine health monitoring node 206 via maintenance port 240. At step 518, a data transfer request may be received and serviced. For example, maintenance computer 402 may transmit a data transfer request to engine health monitoring node 206 via maintenance port 240. The data transfer request may be, for example, a request for a download of data, or a request for an upload of data, such as an upload of a software update.

At step 520, a determination is made as to whether a keep alive period has been exceeded. For example, engine health monitoring node 206 may determine whether the keep alive ID was received within the keep alive period, such as a keep alive period 5 seconds. If the keep alive ID was received within the keep alive period (e.g., keep alive period is not exceeded), the method proceeds to step 522, where the data transfer request is granted.

Otherwise, if the keep alive ID was not received within the keep alive period (e.g., keep alive period is exceeded), the method proceeds to step 524, where any data transfers must be encrypted. For example, engine health monitoring node 206 may reject any data transfers that are not encrypted, while allowing data transfers for the data transfer request that are encrypted. The method then proceeds to step 526, where the data transfer request is complete and maintenance port data access is terminated. For example, to regain data access to the maintenance port, access would need to be requested as described above with respect to step 504.

Back at step 522, where the data transfer request is granted, the method proceeds to step 528, where data encrypted for the data transfer is stopped. For example, engine health monitoring node 206 may allow for data transfers for the requested data transfer request to be unencrypted. Proceeding to step 530, a determination is made as to whether the requested service is complete. For example, engine health monitoring node 206 may determine if the data transfer request is complete. If the requested service is not complete, the method proceeds back to step 520. Otherwise, the method proceeds back to step 518, where another data transfer request may be serviced.

Figure 6:
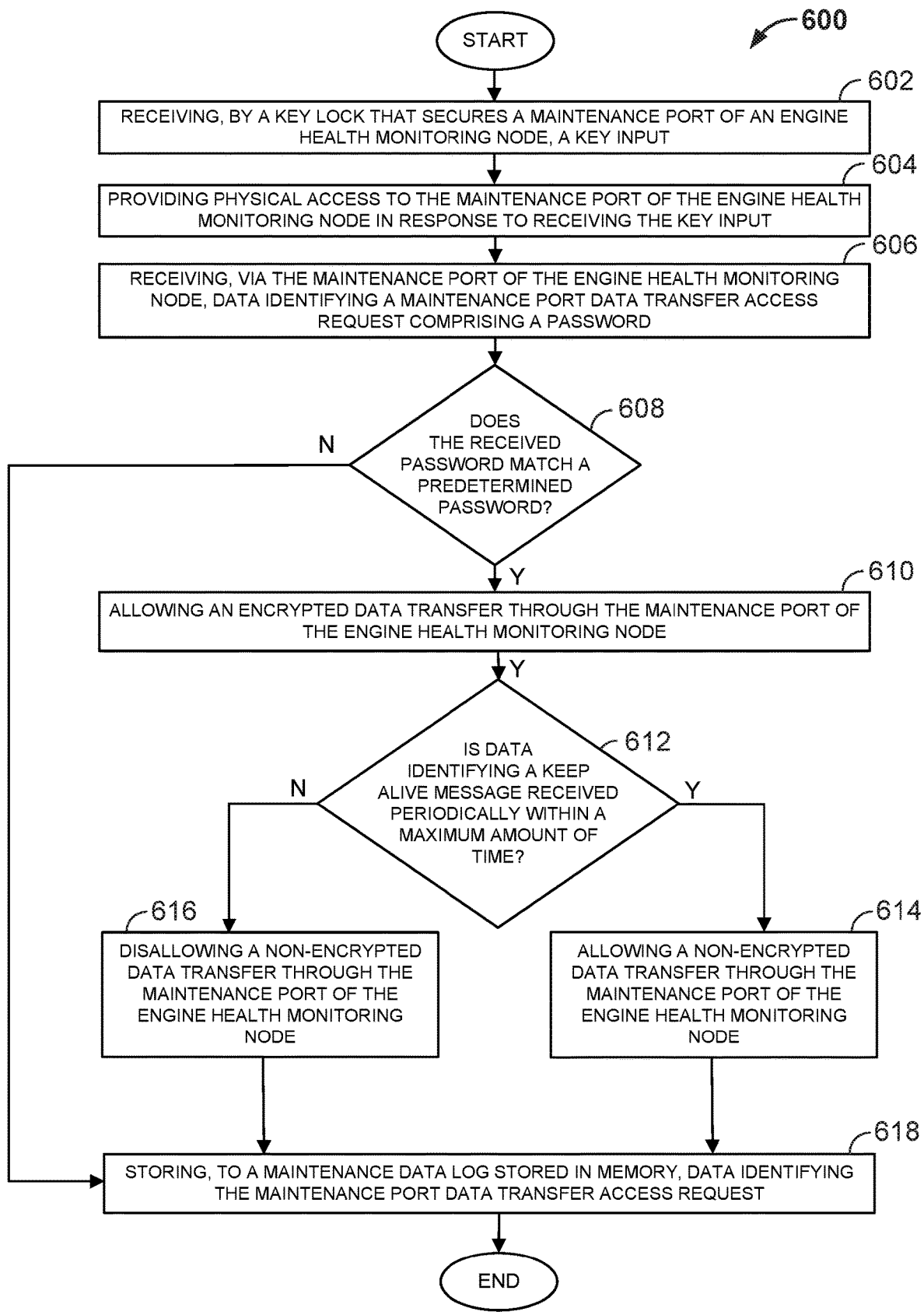
FIG. 6 is a flowchart of another example method that can be carried out by the engine control system of FIG. 3 in accordance with some embodiments.

FIG. 6 is a flowchart of another example method 600 that can be carried out by, for example, the engine control system of FIG. 3. At step 602, a key lock that secures a maintenance port of an engine health monitoring node receives a key input. For example, key lock 328, which secures maintenance port 240 of engine health monitoring node 205, may receive a key to disengage. At step 604, physical access is provided to the maintenance port of the engine health monitoring node in response to receiving the key input. For example, security door 329 may be opened to allow access to maintenance port 240. In some examples, opening security door 329 allows for a wireless communication to be established with engine health monitoring node 205.

At step 606, the maintenance port of the engine health monitoring node, such as engine health monitoring node 206, receives data identifying a maintenance port data transfer access request. The maintenance port data transfer request includes a password. Proceeding to step 608, a determination is made as to whether the received password matches a predetermined password. For example, the engine health monitoring node may unencrypt a password located in encrypted credential data 308 to determine the predetermined password, and may compare it to the received password. If the received password matches the predetermined password, the method proceeds to step 610. Otherwise, the method proceeds to step 618.

Continuing at step 610, engine health monitoring node allows one or more encrypted data transfers through the maintenance port. For example, upon receiving data, the engine health monitoring node 206 may attempt to unencrypt the data with a decryption key. If the decryption is successful, engine health monitoring node 206 may act upon the data. Otherwise, if the decryption is unsuccessful, engine health monitoring node 206 may reject the data.

At step 612, a determination is made as to whether a keep alive message is received periodically within a maximum amount of time. For example, engine health monitoring node 206 may determine whether a keep alive message has been received from a maintenance computer, such as maintenance computer 402, within the last 5 seconds. If engine health monitoring node 206 determines that a keep alive message has been received within the last 5 seconds, the method proceeds to step 614.

At step 614, a non-encrypted data transfer through the maintenance port of the engine health monitoring node is allowed (e.g., permitted). For example, engine health monitoring node 206 may communicate to maintenance computer 402 that non-encrypted data transfers are allowed. In response, maintenance computer 402 may request, in an unencrypted message, a download of sensor data or flight data. The data download itself may also be unencrypted. In some examples, the maintenance computer may communicate to engine health monitoring node that communications through the maintenance port are to remain encrypted. The method then proceeds to step 618.

Back at step 612, if engine health monitoring node 206 determines that a keep alive message has not been received within the last 5 seconds, the method proceeds to step 616, where any unencrypted data transfers are not allowed (e.g., rejected). For example, if engine health monitoring node 206 determines that data received from maintenance port 240 is unencrypted (as described herein), engine health monitoring node 206 may reject the data, and provide an error response (e.g., to maintenance computer 402). The method then proceeds to step 618.

As step 618, data identifying the maintenance port data transfer request is stored to a maintenance data log stored in memory. For example, engine health monitoring node 206 may encrypt data related to the maintenance port data transfer request, such as the time and date of the request, as well as data related to the type of data transfer request (e.g., upload of software update, download of sensor data or flight data). Engine health monitoring node 206 may then store the resulting encrypted data log data 311 in encrypted database 302.

Although the methods are described with reference to illustrated flowcharts, it will be appreciated that many other ways of performing the acts associated with the methods may be used. For example, the order of some operations may be changed, and some of the operations described may be optional.

Among other advantages, the control system and methods described herein may provide for data security and cyber security countermeasures within the control system. For example, the control system and methods allow for the use of more of the frequency spectrum for communications (e.g., data exchange). In addition, the control system and methods allow for the changing of communication frequencies and rates, as well as for data redundancy over multiple communication links that may be operating at differing communication frequencies and/or rates. Persons of ordinary skill in the art having the benefit of the disclosures herein would recognize these and other benefits as well.

Although examples are illustrated and described herein, embodiments are nevertheless not limited to the details shown, since various modifications and structural changes may be made therein by those of ordinary skill within the scope and range of equivalents of the claims.

What is claimed is:

1. A method for accessing an aircraft control system comprising:
   receiving, by a key lock that secures a maintenance port of an engine health monitoring node, a key input;
   providing physical access to the maintenance port of the engine health monitoring node in response to receiving the key input;
   receiving, via the maintenance port of the engine health monitoring node, data identifying a maintenance port data transfer access request comprising a password;
   determining whether the received password matches a predetermined password to allow data transfer access through the maintenance port of the engine health monitoring node;
   in response to determining that the received password matches the predetermined password:
     allowing an encrypted data transfer through the maintenance port of the engine health monitoring node;
     determining whether data identifying a keep alive message is received periodically within a maximum amount of time;
     in response to determining that the data identifying the keep alive message is received periodically within the maximum amount of time, allowing a non-encrypted data transfer through the maintenance port of the engine health monitoring node; and
     in response to determining that the data identifying the keep alive message is not received periodically within the maximum amount of time, disallowing the non-encrypted data transfer through the maintenance port of the engine health monitoring node; and
   storing, to a maintenance data log stored in a memory device, data identifying the maintenance port data transfer access request.

2. The method of claim 1 further comprising:
   receiving a decryption key;
   determining whether the decryption key successfully decrypts data encrypted with an encryption key; and
   in response to determining that the decryption key successfully decrypts the data encrypted with the encryption key, encrypting the encrypted data transfer with the encryption key when the data identifying the keep alive message is not received periodically within the maximum amount of time.

3. The method of claim 2, further comprising, in response to determining that the decryption key does not successfully decrypt the data encrypted with the encryption key, disallowing the non-encrypted data transfer through the maintenance port.

4. The method of claim 1, further comprising requiring receiving the password a second time to allow continued data transfer access through the maintenance port of the engine health monitoring node in response to determining that the data identifying the keep alive message is not received periodically within the maximum amount of time.

5. The method of claim 1, further comprising:
   determining that the received password does not match the predetermined password; and
   in response to determining that the received password does not match the predetermined password, denying the maintenance port data transfer access request.

6. The method of claim 5, wherein denying the maintenance port data transfer access request comprises denying a subsequent maintenance port data transfer access request until a minimum amount of time has passed since determining that the received password does not match the predetermined password.

7. The method of claim 1, wherein the non-encrypted data transfer through the maintenance port of the engine health monitoring node is a download of non-encrypted maintenance log data comprising at least one of: sensor data and flight data.

8. The method of claim 1, wherein the key lock is a radio-frequency identification (RFID) lock, wherein receiving the key input comprises receiving an RFID signal from an RFID tag.

9. The method of claim 1, wherein the encrypted data transfer comprises at least one of an operating system (OS) or application software update, further comprising:
   decrypting the at least one of the OS or application software with a decryption key;
   determining whether the decrypting the at least one of the OS or application software with the decryption key is successful;
   in response to determining that the decrypting the at least one of the OS or application software with the decryption key is successful, storing the encrypted data transfer in the memory device; and
   in response to determining that the decrypting the at least one of the OS or application software with the decryption key is not successful, rejecting the encrypted data transfer.

10. An aircraft control system comprising:
   a control node comprising a first processor;
   an engine health monitoring node operatively coupled to the control node and comprising a second processor and a maintenance port, wherein the engine health monitoring node is configured to:
     receive, via the maintenance port of the engine health monitoring node, data identifying a maintenance port data transfer access request comprising a password;
     determine whether the received password matches a predetermined password to allow data transfer access through the maintenance port of the engine health monitoring node;
     in response to determining that the received password matches the predetermined password:
       allow an encrypted data transfer through the maintenance port of the engine health monitoring node;
       determine whether data identifying a keep alive message is received periodically within a maximum amount of time;
       in response to determining that the data identifying the keep alive message is received periodically within the maximum amount of time, allow a non-encrypted data transfer through the maintenance port of the engine health monitoring node; and
       in response to determining that the data identifying the keep alive message is not received periodically within the maximum amount of time, disallow the non-encrypted data transfer through the maintenance port of the engine health monitoring node; and store, to a maintenance data log stored in a memory device, data identifying the maintenance port data transfer access request; and an enclosure preventing physical access to the maintenance port, wherein the enclosure comprises a key lock that, in response to receiving a key input, allows for physical access to the maintenance port of the engine health monitoring node.

11. The aircraft control system of claim 10, wherein the engine health monitoring node is configured to:
receive a decryption key;
determine whether the decryption key successfully decrypts data encrypted with an encryption key; and
in response to determining that the decryption key successfully decrypts the data encrypted with the encryption key, encrypt the encrypted data transfer with the encryption key when the data identifying the keep alive message is not received periodically within the maximum amount of time.

12. The aircraft control system of claim 11, wherein the engine health monitoring node is configured to, in response to determining that the decryption key does not successfully decrypt the data encrypted with the encryption key, disallow the non-encrypted data transfer through the maintenance port.

13. The aircraft control system of claim 10, wherein the engine health monitoring node is configured to, in response to determining that the data identifying the keep alive message is not received periodically within the maximum amount of time, require receiving the password a second time to allow continued data transfer access through the maintenance port of the engine health monitoring node.

14. The aircraft control system of claim 10, wherein the engine health monitoring node is configured to:
determine that the received password does not match the predetermined password; and
in response to determining that the received password does not match the predetermined password, denying the maintenance port data transfer access request.

15. The aircraft control system of claim 14, wherein denying the maintenance port data transfer access request comprises denying a subsequent maintenance port data transfer access request until a minimum amount of time has passed since determining that the received password does not match the predetermined password.

16. The aircraft control system of claim 10, wherein the non-encrypted data transfer through the maintenance port of the engine health monitoring node is a download of non-encrypted maintenance log data comprising at least one of: sensor data and flight data.

17. The aircraft control system of claim 10, wherein the encrypted data transfer comprises at least one of an operating system (OS) or application software update, wherein the engine health monitoring node is configured to:
decrypt the at least one of the OS or application software with a decryption key;
determine whether the decrypting the at least one of the OS or application software with the decryption key is successful;
in response to determining that the decrypting the at least one of the OS or application software with the decryption key is successful, store the encrypted data transfer in the memory device; and
in response to determining that the decrypting the at least one of the OS or application software with the decryption key is not successful, reject the encrypted data transfer.

18. A non-transitory computer readable medium having instructions stored thereon, wherein the instructions, when executed by at least one processor, cause a device to perform operations comprising:
receiving a key input signal indicating that a key lock that secures a maintenance port of an engine health monitoring node has received a key input;
providing a key unlock signal to the key lock in response to receiving the key input to allow physical access to the maintenance port of the engine health monitoring node;
receiving, via the maintenance port of the engine health monitoring node, data identifying a maintenance port data transfer access request comprising a password;
determining whether the received password matches a predetermined password to allow data transfer access through the maintenance port of the engine health monitoring node;
in response to determining that the received password matches the predetermined password:
allowing an encrypted data transfer through the maintenance port of the engine health monitoring node;
determining whether data identifying a keep alive message is received periodically within a maximum amount of time;
in response to determining that the data identifying the keep alive message is received periodically within the maximum amount of time, allowing a non-encrypted data transfer through the maintenance port of the engine health monitoring node; and
in response to determining that the data identifying the keep alive message is not received periodically within the maximum amount of time, disallowing the non-encrypted data transfer through the maintenance port of the engine health monitoring node; and
storing, to a maintenance data log stored in a memory device, data identifying the maintenance port data transfer access request.

19. The non-transitory computer readable medium of claim 18 further comprising instructions stored thereon that, when executed by the at least one processor, further cause the device to perform operations comprising:
receiving a decryption key;
determining whether the decryption key successfully decrypts data encrypted with an encryption key; and
in response to determining that the decryption key successfully decrypts the data encrypted with the encryption key, encrypting the encrypted data transfer with the encryption key when the data identifying the keep alive message is not received periodically within the maximum amount of time.

20. The non-transitory computer readable medium of claim 18 further comprising instructions stored thereon that, when executed by the at least one processor, further cause the device to perform operations comprising:
decrypting the at least one of the OS or application software with a decryption key;
determining whether the decrypting the at least one of the OS or application software with the decryption key is successful;
in response to determining that the decrypting the at least one of the OS or application software with the decryption key is successful, storing the encrypted data transfer in the memory device; and in response to determining that the decrypting the at least one of the OS or application software with the decryption key is not successful, rejecting the encrypted data transfer.

\* \* \* \* \*